United States Patent [19]
Persson

[11] 3,907,249
[45] Sept. 23, 1975

[54] VALVE DEVICE FOR RESTRICTING THE FLOW OF A LIQUID BY A HELICAL FLOW PASSAGE

[75] Inventor: Bengt Arne Persson, Djursholm, Sweden

[73] Assignee: B A Installationsutveckling AB, Djursholm, Sweden

[22] Filed: Mar. 15, 1974

[21] Appl. No.: 451,657

[30] Foreign Application Priority Data
Mar. 15, 1973 Sweden .............................. 7303659

[52] U.S. Cl. ................................ 251/126; 251/126
[51] Int. Cl.² ........................................ F16K 47/00
[58] Field of Search ....................... 251/126; 138/42

[56] References Cited
UNITED STATES PATENTS
1,604,782  10/1926  Pasman .............................. 251/126
1,625,589  4/1927   Bletcher et al. .................... 251/126
2,017,799  10/1935  Helfrich ............................. 251/126
3,200,842  8/1965   Wilson .............................. 251/126 X
3,247,967  4/1966   Kucmerosky .................. 251/126 X

*Primary Examiner*—Henry T. Klinksiek
*Attorney, Agent, or Firm*—Sughrue, Rothwell, Mion, Zinn & Macpeak

[57] ABSTRACT

A silent, flow reducing liquid valve includes a cylindrical body 2 (FIG. 1) having a helical liquid passage 6 in the outer surface thereof. The body 2 is axially movable within a surrounding sleeve 1 provided with liquid outlet passages 7. The sleeve is securely held in position by the valve cap 12.

6 Claims, 3 Drawing Figures

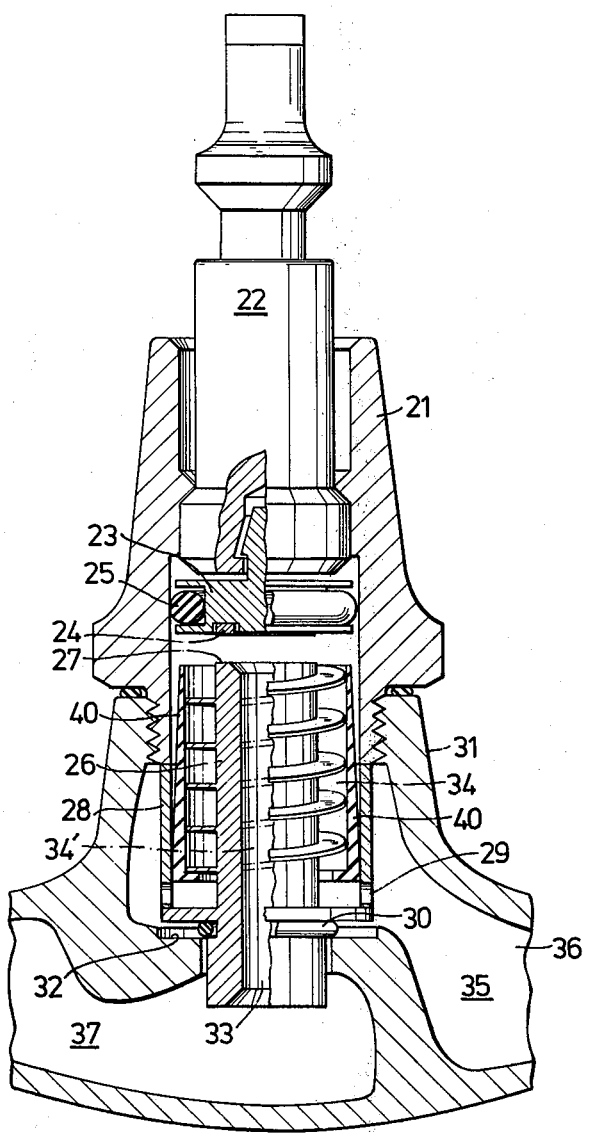

VALVE DEVICE FOR RESTRICTING THE FLOW OF A LIQUID BY A HELICAL FLOW PASSAGE

This invention relates to a valve device for regulating the flow of a liquid in a valve housing supporting a cap-member in which a valve-stem is journalled for axially adjusting a closure member with respect to a valve seating, the flow being restricted by a helical flow passage in the valve housing.

Valves operating as flow restricting members usually are designed to permit cutting off the flow of liquid as well as regulating a predetermined minimum flow abtained in connection with an available minimum supply pressure.

Since the available supply pressure as a rule is considerably higher than the normal supply pressure corresponding to the minimum flow, the flow will in practice, as a rule, be considerably higher than the minimum flow and, as a consequence, give rise to disturbing noise which via the tubes will be transmitted to other parts of the system. Moreover, it may be possible to discharge liquid from valves located at a low level such that the flow of liquid through valves located at a higher level will be momentarily restricted or even interrupted.

In order to limit these drawbacks it is known to restrict the inner diameter of the tubes in the system. In this way the flow rate or the pressure drop can be adjusted to reduce the flow variations to 70 to 150 % of a predetermined normal flow, which is lower than the above mentioned minimum flow. The high flow velocities give rise to cratering corrosion of the low area tubes for which reason said tubes must be replaceable.

The object of the invention is to obtain a flow reducing valve device which without giving rise to disturbing noise can adjust the flow passing through a valve in the same favourable way as obtained with a low area tube system but without its drawback. Moreover, it must be possible to easily use the valve device in connection with existing tubings.

With these objects in view the invention consists in a valve device of the above mentioned type characterized in that the helical passage is located in a cylindrical body surrounded by a cylindrical sleeve provided with outlet apertures for the liquid having passed the helical passage, said sleeve being fixedly mounted with one end portion engaged by the valve housing and the other end portion engaged by the cap-member and in coaxial relationship to the valve-stem.

Further details and advantages of the invention will be more clearly described below with reference to examples of construction and by reference to the accompanying drawings.

In the drawings:

FIG. 3 is a vertical section of a preferred embodiment of a flow reducing device according to the invention mounted in a conventional cock valve.

Figure 1:
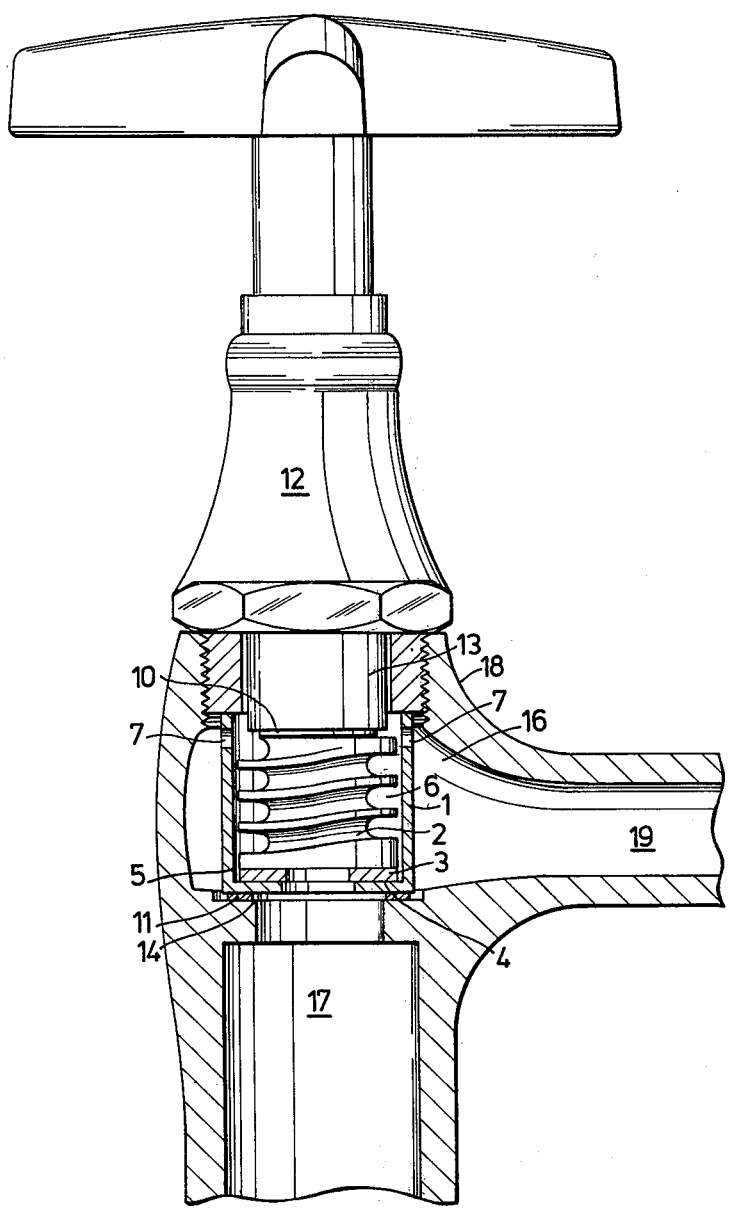
FIG. 1 is a vertical section of an embodiment of a flow reducing device according to the invention mounted in a conventional cock valve in closed position.
Figure 2:
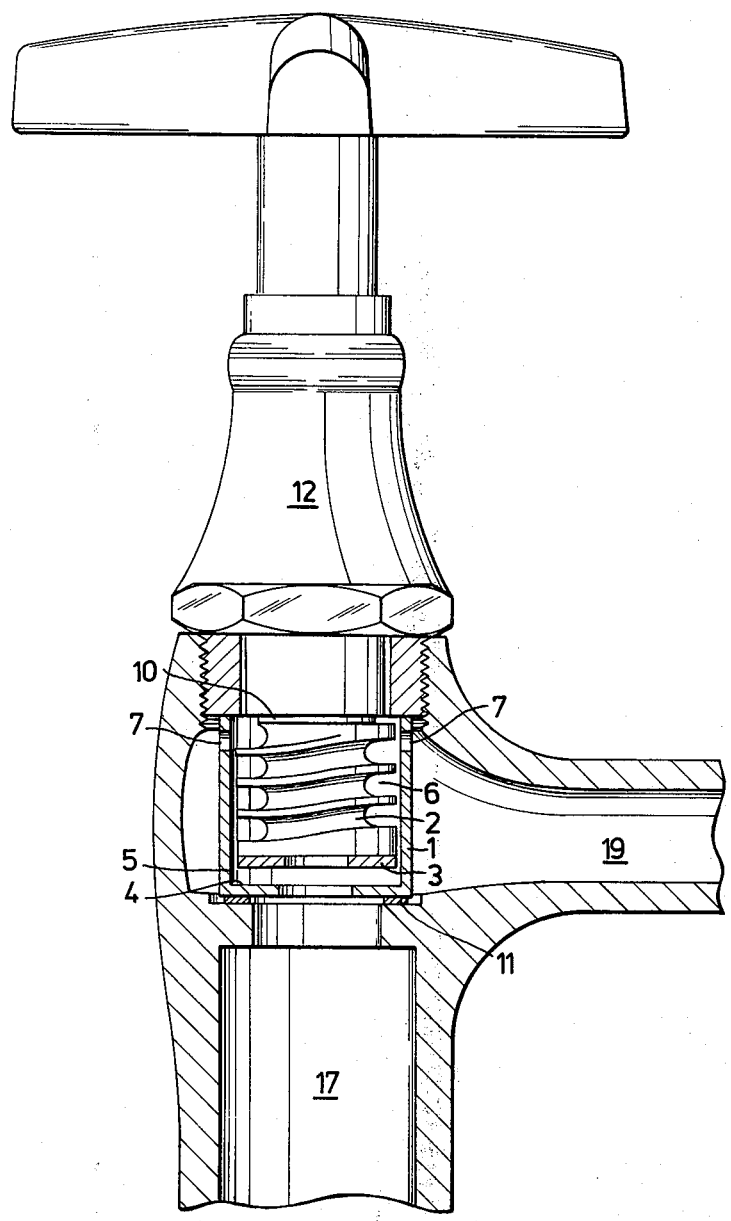
FIG. 2 is a vertical section of the flow reducing device and the cock shown in FIG. 1, the cock being shown in opened position.

The cock valve shown in FIGS. 1 and 2 comprises a sleeve 1, a valve body 2 in the shape of a cylindrical body, a sealing ring 3, a valve seating 4, a sealing surface 5, a flow reducing helical passage 6 formed or recessed in the envelope surface of the cylindrical body 2, outlet apertures 7, a washer 10 and a sealing ring 11.

After demounting the valve cap-member 12 and the conventional valve body from the conventional valve housing 18 the sleeve 1 and the valve body 2 have been mounted on the existing valve seating 14 of the cock valve. Between the valve seating 14 and the sleeve 1 the sealing ring 11 is mounted. When the cap-member 12 is mounted on the valve housing 18 the sleeve 1 is clamped in position between the valve seating 14 and the cap-member 12.

When the cock is opened the valve-stem 13 is lifted permitting the valve body 2 together with the passage 6 and the sealing ring 3 to be lifted from the seating 4 by the water pressure in the inlet channel 17 of the cock. Now liquid will pass the seating 4 and flow via the sealing ring 3, the passage 6 and the outlet apertures 7 to the interior 16 of the valve housing and to an outlet channel 19.

The area and length of the passage 6 are adapted to the normal water pressure in the inlet 17 so that the flow and noise level are restricted to allowable values when the water pressure varies with the 24 hours load. When the cock is closed the valve body 2 is displaced by the valve-stem 13 over the washer 10 so that the valve body 2 together with the sealing ring 3 without turning is pressed against the seating 4 thereby bringing the flow of liquid to be interrupted.

As an alternative it is possible to connect the valve body 2 to the valve-stem 13, so that the valve body 2 can be lifted without influence from the liquid pressure in the inlet channel 17. Moreover, the passage 6 can be positioned in the inner wall of the sleeve 1 (not shown).

The cock shown in FIG. 3 comprises a cap-member 21, a valve-stem 22, a valve body 23, a sealing ring 24, an O-ring 25, a cylindrical body 26, a sealing surface 27, a sleeve 28, outlet openings 29 and a sealing ring 30.

After demounting of the cap-member and valve body of the conventional cock 31 the cylindrical body 26 and the sleeve 28 have been mounted upon the existing valve seating 32. The sealing ring 30 has been placed between the seating 32 and the cylindrical body 26. When cap-member 21 is mounted on the valve housing the cylindrical body 26 is clamped in position via the sleeve 28 between the valve seating 32 and the cap-member 21.

When the cock valve is opened valve-stem 22 together with valve-body 23 and the sealing ring 24 are lifted from the sealing surface 27. Liquid now starts flowing through an axial bore 33 in the cylindrical body 26 and passes by the sealing surface 27 and the sealing ring 24 and through a reducing channel or passage 34 arranged in the envelope surface of the cylindrical body 26 and through the apertures 29 to the valve housing 35 and to the outlet channel 36. The bore 33 and the reducing passage 34 have an area and a length adapted to the normal water pressure in the inlet channel 37 so that the flow and the noise level are restricted to allowable values when the water pressure varies with the 24 hours load. When the cock is closed the valve body 23 and the sealing ring 24 are pressed without turning against the sealing surface 27.

If necessary or as an alternative a helical reducing passage 34' may be arranged in the inner wall of the bore 33, as indicated by dotted lines in FIG. 3.

Moreover, it is possible to attach the bottom edge portion of a flexible sleeve, e.g. a rubber sleeve 40, as shown in FIG. 3, to the inner wall of the sleeve 28 just above the apertures 29 with the flexible sleeve 40 fitted in a play between the inner wall of the sleeve 28 and the envelope surface of the cylindrical body 26, so that the water pressure can press a portion of the flexible sleeve 40 into the reducing passage 34 in order to further reduce the flow in response to a varying supply water pressure in a manner known per se.

I claim:

1. A valve device for regulating the flow of a liquid in a valve housing supporting a cap-member in which a valve-stem is journalled for axially adjusting a closure member with respect to a valve seating, the flow being restricted by a helical flow passage in the valve housing, characterized in that the helical passage is located in a cylindrical body surrounded by a cylindrical sleeve provided with outlet apertures for the liquid having passed the helical passage, said sleeve being fixedly mounted with one end portion engaged by the valve housing and the other end portion engaged by the cap-member and in coaxial relationship to the valve-stem.

2. A valve device as claimed in claim 1, characterized in that the helical passage is located in the surface of the cylindrical body which is slidable in the surrounding sleeve and by means of the valve-stem is movable to close the valve seating.

3. A valve device as claimed in claim 1, characterized in that the helical passage is located in the surface of the cylindrical body which is rigidly connected to the surrounding sleeve and is provided with a central boring through which the flow of liquid is passed from the valve seating to the end portion of the central boring facing the cap-member, from which end portion the flow of liquid is passed to the helical passage and which end portion is adapted to form a valve seating coacting with a closure member attached to the valve-stem.

4. A valve device as claimed in claim 3, characterized in that also the central boring is provided with a helical passage.

5. A valve device as claimed in claim 1, characterized in that the end portion of the valve-stem is provided with a cylindrical head which is rotatably connected to the valve-stem and around its periphery is provided with a sealing member slidingly and sealingly applied to the inner wall of the cap-member.

6. A valve device as claimed in claim 1, characterized in that an elastic sleeve member is positioned around the surface of the cylindrical body, a small play being positioned between the major portion of the elastic sleeve and said surrounding sleeve, the elastic sleeve being seealingly connected with the surrounding sleeve at its outlet opening but before its outlet apertures.

* * * * *